United States Patent [19]

Stoffel et al.

[11] 4,433,346
[45] Feb. 21, 1984

[54] RASTER INPUT SCANNER

[75] Inventors: James C. Stoffel, Rochester; Ned J. Seachman, Penfield; Jack R. Hauber, Webster; William Kingsley, Rochester, all of N.Y.

[73] Assignee: Xerox Corporation, Stamford, Conn.

[21] Appl. No.: 364,131

[22] Filed: Mar. 31, 1982

[51] Int. Cl.³ .......................... H04N 1/10; H04N 1/12
[52] U.S. Cl. .................... 358/293; 358/294; 358/280; 358/283
[58] Field of Search ............... 358/293, 294, 285, 280, 358/283; 355/8

[56] References Cited

U.S. PATENT DOCUMENTS

| | | | |
|---|---|---|---|
| 3,826,926 | 7/1974 | White et al. | 307/221 |
| 3,962,681 | 6/1976 | Requa et al. | 340/146.3 H |
| 4,002,829 | 1/1977 | Hutchison | 358/286 |
| 4,166,691 | 9/1979 | Ebi et al. | 355/11 |
| 4,189,225 | 2/1980 | Nishikawa | 355/8 |
| 4,194,221 | 3/1980 | Stoffel | 358/257 |
| 4,239,383 | 12/1980 | Peterson | 355/8 |
| 4,268,870 | 5/1981 | Kitamura et al. | 358/296 |
| 4,278,999 | 7/1981 | Ganguly | 358/294 |
| 4,288,820 | 9/1981 | Minamibayashi | 358/294 |
| 4,288,821 | 9/1981 | Lavallee | 358/294 |
| 4,352,128 | 9/1982 | Ohori | 358/294 |
| 4,358,794 | 11/1982 | Kurakami | 358/294 |
| 4,366,509 | 12/1982 | Norrell | 358/280 |

Primary Examiner—Howard W. Britton
Attorney, Agent, or Firm—Frederick E. McMuller

[57] ABSTRACT

A high speed parallel process raster input scanner employing time delay in integration (TDI) arrays for scanning plural lines of an original document. The lines of image signals output by the arrays are processed simultaneously, such processing including a two dimensional digital processor for processing text and pictorial image signals which are then input to a detector for selecting one or the other of the text and pictorial image signals for output from the scanner.

8 Claims, 9 Drawing Figures

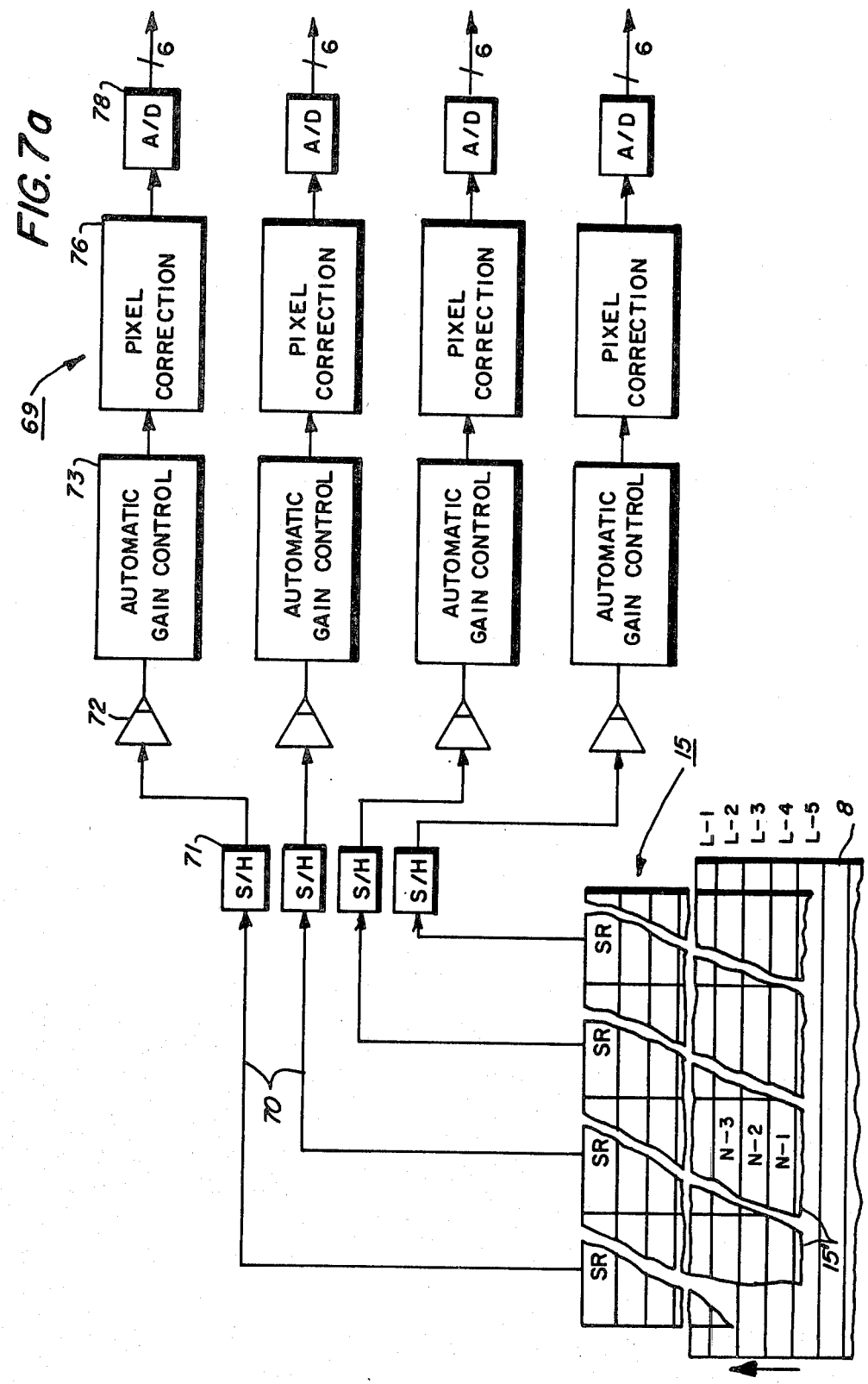

RASTER INPUT SCANNER

The invention relates to image input terminals, and more particularly to an improved microscanning image input terminal.

Image input terminals are used to scan document originals to convert the image content thereof to video image signals or pixels. In devices of this type increased throughput is always a goal. However, a large number of factors mitigate against increases in image input terminal performance, chief among these being inertia of the system mechanical parts and performance limitations of the image input terminal components.

For example, successful operation of a scanning device requires that sufficient illumination be provided at the point of scan and further that the illumination be accurately synchronized with both the scanning array and any other ancillary component such as a document feeder. However, the design and implementation of an illumination system that meets this goal and further that provides reliable and uniform illumination at a relatively modest cost is very elusive as evidenced by the many illumination system variations to be found in the art. That difficulty is compounded as scanning speeds are increased. In a similar manner the design of any scanning optical system for high speed systems faces problems of a like nature. And the scanning array itself may limit performance by its inability to read and process image data at the high rate desired.

The invention relates to a high speed raster input scanner comprising a transparent platen for supporting documents to be scanned; lamp means for providing a wedge-shaped beam of light to illuminate at least N lines of the document thereon; at least one scanning array; the array comprising a two dimensional array for reading N image lines, optical means interposed between the platen and the array for focusing N image lines of the document on the array; and drive means to move either the lens and the lamp means or the document in synchronism with scanning operation of a the array to scan the document.

IN THE DRAWINGS

Figure 1:
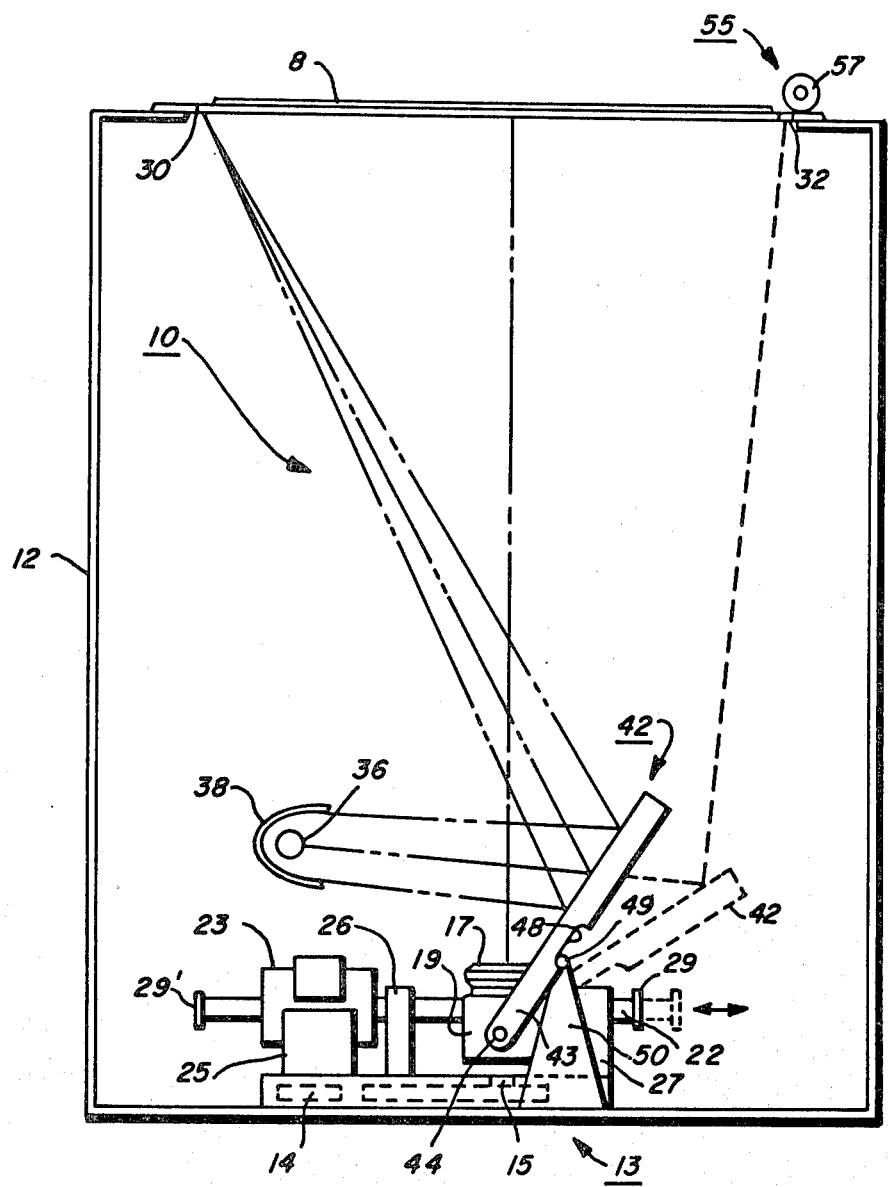
FIG. 1 is a side view in cross section illustrating the image input terminal of the present invention.
Figure 5:
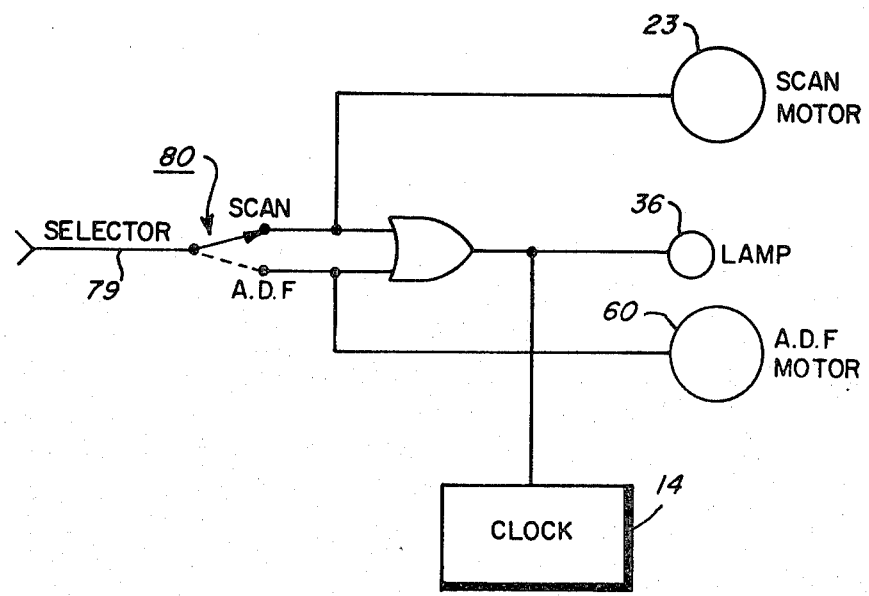
FIG. 5 is a logic schematic of the operating control system for the image input terminal shown in FIG. 1.
Figure 8:
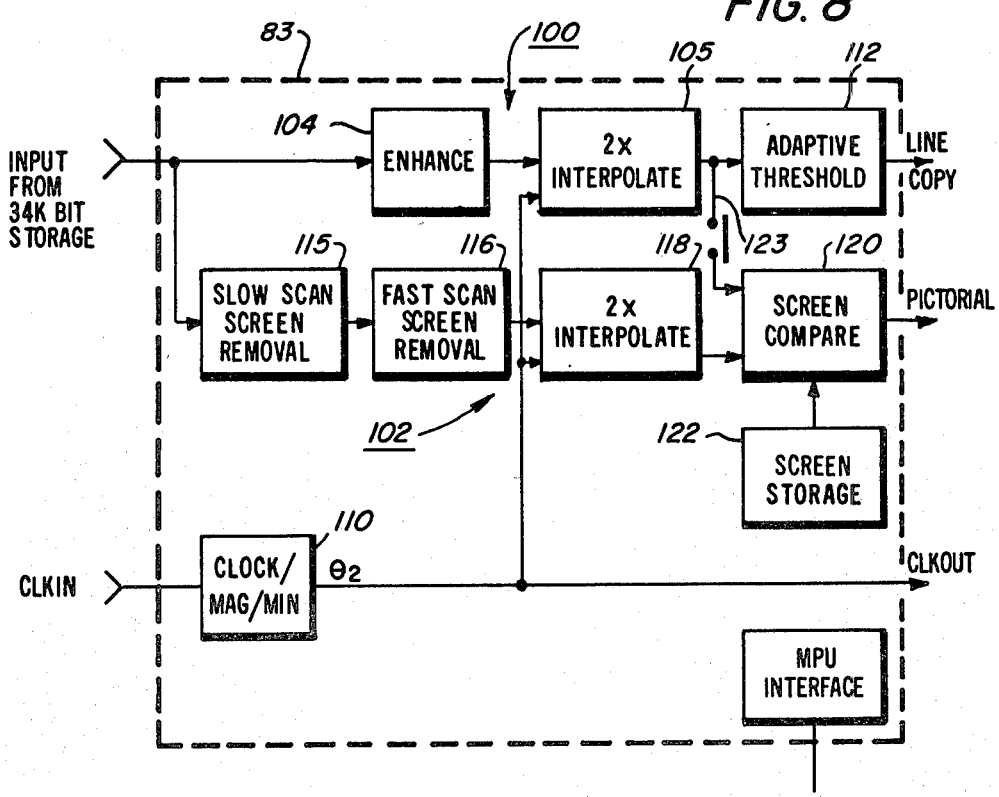
Figure 7B:
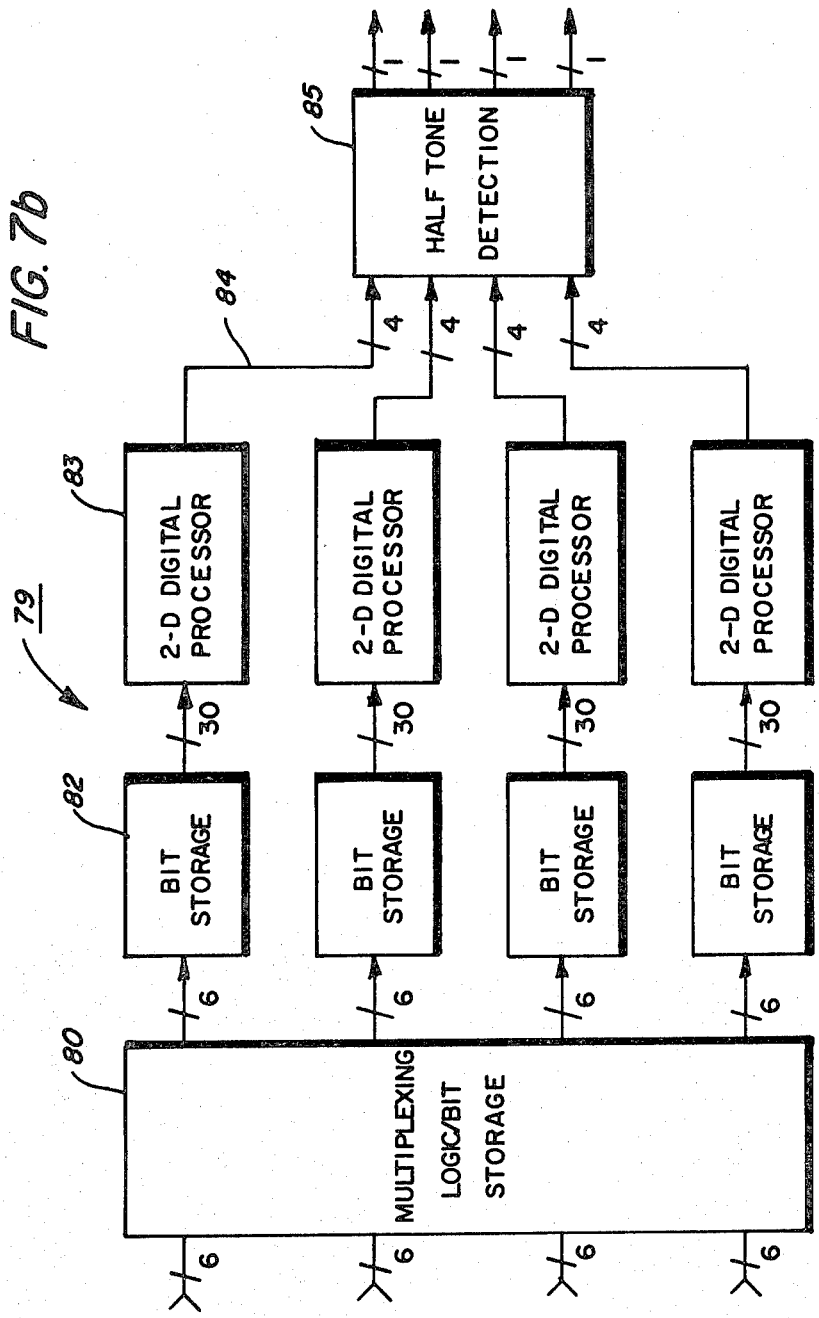

FIGS. 7a and 7b comprise a logic diagram in block form illustrating the image processing system for the image input terminal shown in FIG. 1; and FIG. 8 is a circuit schematic showing details of the two dimensional image processor used in the image processing system shown in FIG. 5.

Figure 2:
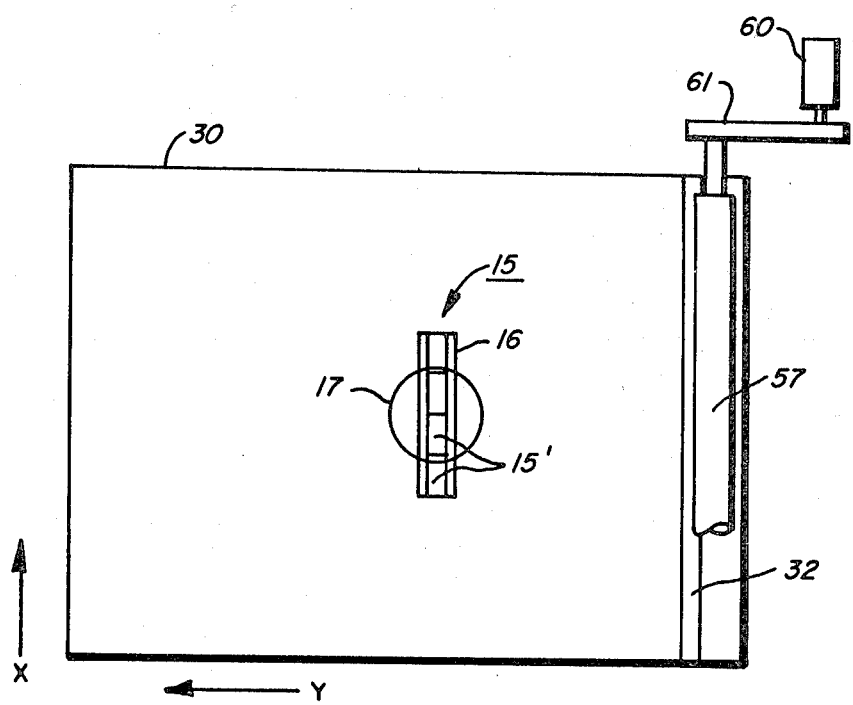
FIG. 2 is a top view in cross section of the image input terminal shown in FIG. 1.

Referring particularly to FIGS. 1 and 2 of the drawings, there is shown the scanning apparatus 10 of the present invention. Scanning apparatus 10 includes a suitable frame 12 on the lower or base portion 13 of which a scanning array 15 is suitably supported in fixed position. Array 15 consists of a plurality of two dimensional (i.e. N lines × M photosites) time delay in integration (T.D.I.) arrays 15' which scan N lines of a document at one time as will appear. In the preferred arrangement shown, array 15 is composed of four T.D.I. arrays 15' disposed in abutting relationship on a common base 16 to prevent any gaps in the viewing field of the scanning apparatus 10. However, the invention is not intended to be limited to the specific number of arrays 15' shown, but instead any suitable number of arrays may be employed to provide the scanning array 15.

A suitable clock means 14 is provided for operating scanning array 15.

A lens 17 is supported above array 15 and in relatively close proximity thereto, lens 17 serving to focus the image rays reflected from the document being scanned onto the array 15. Lens 17 is supported in a block like structure, identified as lens block 19 herein, which in turn is fixedly attached to and supported by the armature shaft 22 of a linear type motor 23. Motor 23 is supported in stationary position on base 13 by support 25. A pair of spaced journal blocks 26, 27 provide further support for armature shaft 22, blocks 26, 27 being secured to base 13 of frame 12. Suitable journal or bearing means (not shown) in blocks 26, 27 permit reciprocating movement of armature shaft 22 in the direction shown by the solid line arrow of FIG. 1.

Linear motor 23 may comprise any suitable linear actuator, i.e. a voice coil, hydraulic cylinder, etc. Stops 29, 29' on armature shaft 22 cooperate with the motor housing and end block 27 to limit reciprocating movement of armature shaft 22 and the lens 17 mounted thereon.

A substantially planar platen 30 for supporting documents 8 to be scanned is mounted on frame 12 in preset spaced relationship to lens 17 and the scanning array 15. Platen 30, which is formed from any suitable transparent material such as glass serves in the scanning apparatus 10 as a support for the document 8 to be scanned. As will appear, scanning apparatus 10 provides two alternate scanning modes permitting the operator or user to either program scanning apparatus 10 to scan a stationary document 8 on platen 30 (SCAN MODE) or to scan a document as the document is being transported across platen 30 by a document feeder (ADF MODE).

To illuminate the document 8 to be scanned, a high intensity lamp 36 is provided, lamp 36 being suitably supported on frame 12. An elliptical reflector 38 cooperates with lamp 36 to direct a sheet or wedge-like beam of light onto a sweep mirror 42.

Figure 3:
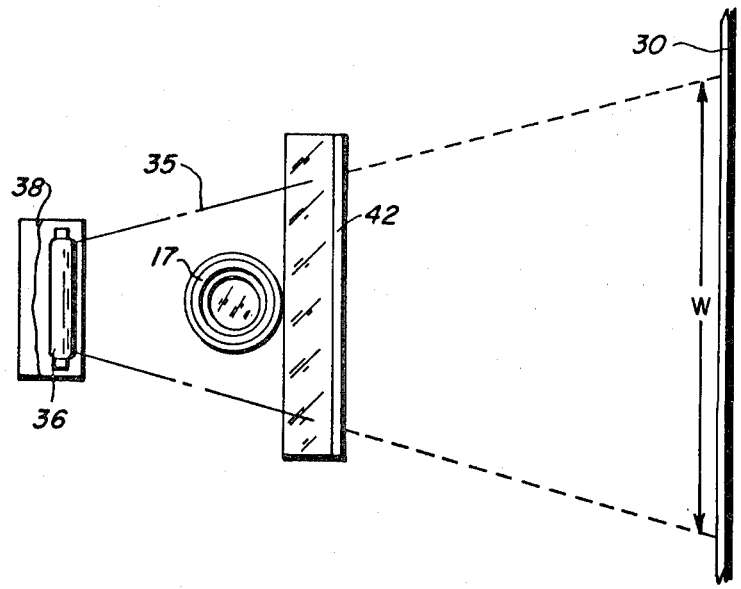
FIG. 3 is a view in the horizontal plane showing the scanning beam unfolded.
Figure 4:
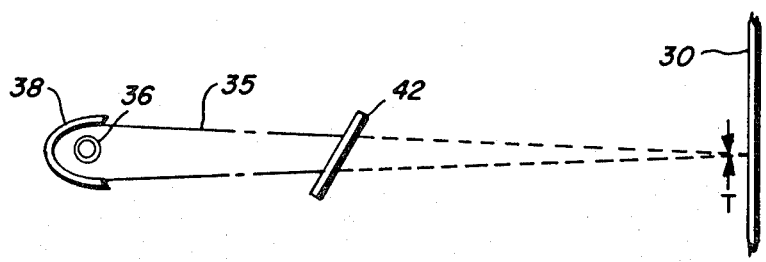
FIG. 4 is a view in the vertical plane showing the scanning beam unfolded.

Referring particularly to FIGS. 3 and 4 of the drawings, lamp 36, reflector 38 and sweep mirror 42 cooperate to provide a beam of light 35 which diverges when viewed in the horizontal plane and which when viewed in the vertical plane converges at platen 30. The relative operating parameters and disposition of the beam generating components are chosen to provide a scanning beam 35 whose width (W) in the cross scan direction is at least equal to the width of the largest document 8 to be scanned and whose thickness (T) in the scan direction is at least equal to the number of lines N simultaneously viewed by array 15. And while reflector 38 is shown as being elliptical in shape, other configurations such as parabolic may be envisioned.

For operation in the SCAN MODE, mirror 42 is supported for oscillating movement by an upwardly projecting arm pair 43 pivotally attached as by pins 44 on the extremities of lens block 19. In the embodiment shown, the axis of rotation of mirror 42 about pins 44 intersects the optical axis of lens 17. To impart the required oscillating movement to mirror 42, arms 43 are provided with suitably configured cam tracks 48, cam tracks 48 being engageable with cam rollers 49 mounted on cam support members 50. Cam support members 50 are in turn fixed to base 13 of frame 12. Accordingly, as armature shaft 22 reciprocates back and forth, engagement of cam tracks 48 with cam rollers 49 cause mirror 42 to swing in a predetermined arc about the axis of pins 44 to sweep the wedge of light emitted by lamp 36 across platen 30 (in the scan or Y direction) in searchlight fashion.

For operation in the ADF MODE, a slit-like scanning aperture 32 is provided in platen 30 adjacent one end thereof, aperture 32 extending in the cross scan (i.e. the X direction) across the width of platen 30. As will be understood, the dimension of aperture 32 in the cross scan direction (i.e. the X direction) is sufficient to accommodate the largest document 8 to be scanned while the width of aperture 32 in the scan direction (i.e. the Y direction) is at least equal to the number of lines N viewed by array 15. A document transport or feeder 55 is provided to move the document to be scanned across scanning aperture 32, document transport 55 being illustrated herein as a constant velocity transport (C.V.T.) roll 57 forming in cooperation with the surface of platen 30 adjacent scanning aperture 32 a nip between which the document feeds. C.V.T. roll 57 is suitably journaled for rotation in the apparatus frame 12 and is drivingly coupled to a suitable document feeder motor such as step motor 60 as by belt 61. Actuation of step motor 60 rotates C.V.T. roll 57 which in turn cooperates with platen 30 to transport the document to be scanned across scanning aperture 32 at a predetermined scanning rate. In this operational mode, lens 17 and sweep mirror 42 are parked in a predetermined position (the dotted line position of FIG. 1) such that scanning aperture 32 is illuminated by beam 35 and focused by lens 17 onto array 15.

Referring to FIG. 5, a suitable mode selector 80 is provided to permit the operator or user to select the operating mode of scanning apparatus 10, i.e. either SCAN MODE or ADF MODE. For operation in the SCAN MODE, the document 8 to be scanned is manually placed on platen 30 and selector 80 set to the solid line position shown readying linear motor 23, lamp 36, and clock means 14 for operation. On a demand for image signals, an actuating signal in line 79 energizes lamp 36, clock means 14, and linear motor 23, the latter moving lens 17 together with sweep mirror 42 through a preset scan path. As lens 17 and sweep mirror 42 move, mirror 42 sweeps the beam 35 output by lamp 36 across the platen 30 to progressively illuminate the document lines. Concurrently therewith, the image rays reflected from document 8 are focused onto array 15 by lens 17, movement of lens 17 serving to maintain focus as the light beam 35 is swept across platen 30.

Where ADF MODE is selected, selector 80 is set to the dotted line position shown in FIG. 5. In this position, lamp 36, clock means 14, and document feeder motor 60 are readied for energization, it being understood that lens 17 and sweep mirror 42 are disposed in the predetermined park position shown by the dotted lines of FIG. 1 to illuminate scanning aperture 32 and focus aperture 32 onto array 15. The document 8 to be scanned is inserted into the nip formed between C.V.T. roll 57 and platen 30, and on a demand for image signals, the actuating signal in line 79 energizes lamp 36, clock means 14 and document feeder motor 60, the latter feeding the document 8 across scanning aperture 32 for scanning by array 15.

Figure 6:
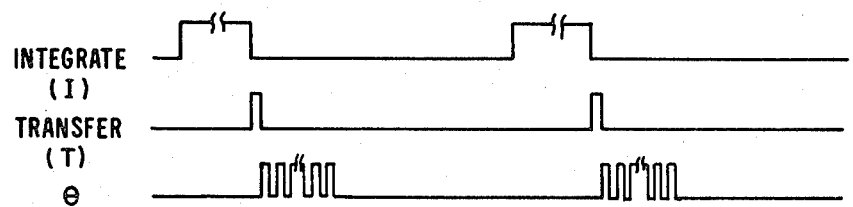
FIG. 6 is a timing chart for the scanning array used in the image input terminal shown in FIG. 1.

As noted, array 15 is composed of plural two dimensional N lines by M element arrays 15' which may for example comprise 20 line by 1500 element arrays. In the exemplary arrangement disclosed, arrays 15' are of the charge coupled device (C.C.D.) type which operate on the time delay in integration (T.D.I.) principle to enhance system speed and resolution. Referring to FIGS. 6 and 7, during scanning operation, arrays 15' repeatedly view or scan each image line N times, each scan being conducted over a preset integration period as determined by the integrating clock pulses I generated by clock means 14. For example, on start of scanning, the first document line (i.e. L−1) is scanned during the integrating clock pulse I by the array first linear segment (i.e. N−1). On a transfer clock pulse T, the image signals are transferred from the array first linear segment to the next segment (i.e. N−2) as the light beam 35 (if operating in the SCAN MODE) or the document 8 (if operating in the ADF MODE) advances one line. On the next integrating clock pulse I, the array first linear segment (i.e. N−1) scans the next document line (i.e. L−2) while the array second linear segment (i.e. N−2) re-scans the previously scanned first document line (i.e. L−1) to further refine the image signals obtained by the first scan of that document line. On the next transfer pulse T, the image data in the array linear segments are transferred to the next array linear segments (i.e. N−2 to N−3 and N−1 to N−2), the next line of the document (i.e. L−3) is advanced and on the next integration signal I, the next document line (i.e. L−3) along with the previous document lines (i.e. L−1 and L−2) are scanned. The foregoing process is repeated, and on the composite image signals reaching the last linear segment of the array, transfer is made to the on-board parallel in serial out shift registers SR from whence the image signals are clocked out on clock signals $\theta$ in a serial stream to output lines 70.

In content, the document original 8 may be composed entirely of lines, or low frequency halftone image(s), or high frequency halftone image(s), or continuous tone image(s), or combinations thereof. Where the document 8 consists of lines as for example a typed page, the image signals may be converted to either one of two voltage levels, one representing non-image or background areas; the other image areas.

A continuous tone image comprises an unscreened image, typically a photograph. When scanned, the voltage values of the image signals produced are representative of the gray levels making up the picture.

A halftone image, typically a picture or scene, is one which has been reproduced through a screening process. One example is a newspaper picture. The screen used may be either a high or low frequency screen. A high frequency screen is arbitrarily defined herein as one having a frequency of 100 cells per inch or more while a low frequency screen is defined as one having a frequency less than 100 cells per inch. Halftone images, therefore, comprise a pattern of discrete dots, the dot size and frequency of which depends upon the screening frequency used. When viewed by the human eye, the dot pattern conveys a likeness of the original picture or scene. The quality of the reproduction depends upon screening frequency used, with higher screen frequencies normally providing higher quality reproductions.

In the image signal processing system herein described, the image signal output by each array 15' is processed in two parallel paths simultaneously, one path processing line and low frequency halftone images (referred to as line copy), the other path processing high frequency halftone images (referred to as pictorial). Selection of one or the other of the processed line copy and pictorial image signals is thereafter made with the non-selected image signals being discarded. Provision is further made for processing continuous images separately at the discretion of the operator or user.

Referring particularly to FIGS. 7a and 7b of the drawings, the image signals generated by arrays 15 and output to lines 70 are processed in parallel by pre-processing circuits 69 to provide a digital signal input to a Multiplexing Logic/Bit Storage 80, circuits 69 each having a conventional sample and hold circuit 71 which provides a step-like signal output wave that is fed to a suitable amplifier 72 where the image signals are amplified to a predetermined level. Following amplification, the image signals are fed to an automatic gain control circuit 73 where the signals are modified by a preset gain factor designed to bring the image signal level up to a predetermined base level. The image signals output by gain control circuit 73 are input to a pixel correction circuit 76 where the image signals are compensated for artifacts in the scanner components such as illumination imbalance, variations between the individual scanning elements M of arrays 15', etc. The corrected image signals from pixel correction circuits 76, which are analog type signals, are input to analog to a digital (A/D) converter 78 where the analog image signals are converted to digital type signals. In the exemplary arrangement shown, the image signals are converted to six bit image signals.

The digital image signals output by pre-processing circuits 69 are multiplexed and temporarily stored by Multiplexing Logic/Bit Storage 80 in preparation for processing by image processing circuits 79. The memory portion of Multiplexing Logic/Bit Storage 80 allows the abutted arrays 15' to contribute image signals to the adjoining image processing circuits. These image signals provide the context required for processing a given image signal, particularly image signals at the boundary between adjoining arrays. Processing circuits 79 each include a bit storage 82 and two dimensional processor 83, the latter as will appear processing the digital image signals to provide both line copy and pictorial image signal outputs. The line copy and pictorial image signal output of processors 83 is fed via lines 84 to halftone detection circuit 83 where the image is diagnosed, and either the line copy or pictorial image signals output to the signal user which may for example comprise a printer, data compressor, memory, communication channel, etc. The unused image signals are discarded. Halftone detection circuit 83 may for example comprise an autocorrelator of the type shown and described in U.S. Pat. No. 4,194,221 issued to James C. Stoffel on Mar. 18, 1980.

Referring of FIG. 8, two dimensional processors 83 each include line copy and pictorial image processing sections 100, 102. Line copy processing section 100 includes an enhancement circuit 104 for enhancing the image signals which in the arrangement shown, comprises a high pass filter designed to enhance image edges. From circuit 104 the enhanced image signals are fed to interpolator 105 which serves to increase, by interpolation, the number of image signals. In the arrangement shown, interpolator 105 comprises a conventional interpolation circuit driven by clock pulses $\theta_2$ from clock signal magnifier/reducer 110. In the example shown, the clock pulses $\theta_2$, which are derived from clock means 14, are doubled in frequency by magnifier/reducer 110. As a result, the number of image signals are doubled.

The image signals output from interpolator 105 are fed to an adaptive threshold circuit 112 where the image signals are thresholded or compared against a preset signal level, the preset level changing or adapting in response to changes in image conditions as will be understood by those skilled in the art.

Pictorial image processing section 102 includes slow (i.e. Y direction) and fast (i.e. X direction) scan screen removal circuits 115, 116 which serve to descreen the image signals input thereto. The descreened image signals are thereafter input to interpolator 118 which functions in the same manner as the aforedescribed interpolator 105 to multiply the number of image signals. In the example shown, the interpolator 118 doubles the image signals.

Image signals output by interpolator 118 are fed to screen circuit 120 which screens the now unscreened image signals in accordance with a predetermined electronic screen pattern selected from screen storage 122. Line 123 permits the operator or user to screen continuous tone images using screen circuit 120.

While the invention has been described with reference to the structure disclosed, it is not confined to the details set forth but is intended to cover such modifications or changes as may come within the scope of the following claims.

We claim:

1. A high speed raster input scanner comprising a transparent platen for supporting documents to be scanned; lamp means for providing a wedge-shaped beam of light to illuminate at least N lines of the document thereon; a movable mirror for sweeping said beam across said platen; at least one scanning array; said array comprising a two dimensional array for reading N image lines; optical means interposed between said platen and said array for focusing N image lines of said document on said array; and drive means to move said document in synchronism with scanning operation of said array to scan said document lines N times whereby to enhance the operational speed of said scanner, and where said document is supported on said platen, said drive means moving said lens means and said mirror in synchronism with scanning operation of said array to scan said document lines N times whereby to enhance the operational speed of said scanner.

2. The scanner according to claim 1 in which said array is composed of plural two dimensional scanning arrays in side by side relation to form a composite array for scanning said document; means for pre-processing image signals output by said plural arrays in parallel, said pre-processing means including means to convert each of said lines of image signals to digital signals; image signal processing means for processing parallel streams of said image signals simultaneously as line and halftone images respectively to provide line copy and pictorial image signals; and detector means for outputting one of said line copy and said pictorial image signals from said image signal processing means in accordance with the document image content.

3. The scanner according to claims 1 or 2 in which said document is stationary on said platen, said drive means moving said lens means and said mirror in synchronism with scanning operation of said array to scan said document.

4. The scanner according to claim 1 in which said platen includes a slit-like scanning aperture to permit direct viewing of said document by said array, the width of said aperture being at least sufficient to permit said array to simultaneously view said N image lines;

document feeder means for feeding said document across said platen and said aperture; and control means for actuating said document feeder means to feed the document to be scanned across said aperture in synchronism with scanning operation of said array to scan said document.

5. The scanner according to claim 4 in which said lamp means and said mirror cooperate to illuminate said aperture, said lens means focusing said aperture onto said array, said control means disabling said drive means to maintain said lens means and said mirror stationary during operation of said scanning array whereby to permit said scanning array to scan the portion of said document opposite said aperture as said document is fed across said platen and said aperture by said document feeder means.

6. A high speed parallel process raster input scanner comprising, in combination:

(a) a transparent platen for supporting documents to be scanned;

(b) means for generating a wedge-like beam of light;

(c) a mirror interposed in the path of said beam for reflecting said beam onto said platen, said mirror being movable to sweep said beam of light across said platen in a Y scan direction to progressively illuminate the document thereon;

(d) at least one array for scanning said document;

(e) movable lens means interposed between said platen and said array for simultaneously focusing plural lines of said document on said array;

(f) said array being composed of plural rows of image reading elements, said rows of image reading elements being substantially parallel to one another and extending in the X scan direction to read plural lines of said document at once;

(g) drive means for moving said lens means and said mirror in synchronization with one another, said drive means moving said lens means at a fraction of the rate of movement of said mirror; and (h) control means for synchronizing operation of said drive means with scanning operation of said array.

7. The scanner according to claim 6 in which each of said rows of image reading elements outputs a stream of image signals derived from scanning the line of said document associated therewith, and means for processing said image signals on a per line basis.

8. The scanner according to claim 7 in which said processing means includes for each line of image signals, a first processor for processing text images in said image signals output by said array, a second processor for simultaneously processing continuous tone and halftone images in said image signals output by said array, said first and second processors including means to provide additional image signals, and means for outputting the image signals of one of said first and second processors and discarding the image signals of the other.

* * * * *